(No Model.) 2 Sheets—Sheet 2.
M. M. CONNER.
TWO WHEELED VEHICLE.
No. 388,834. Patented Sept. 4, 1888.
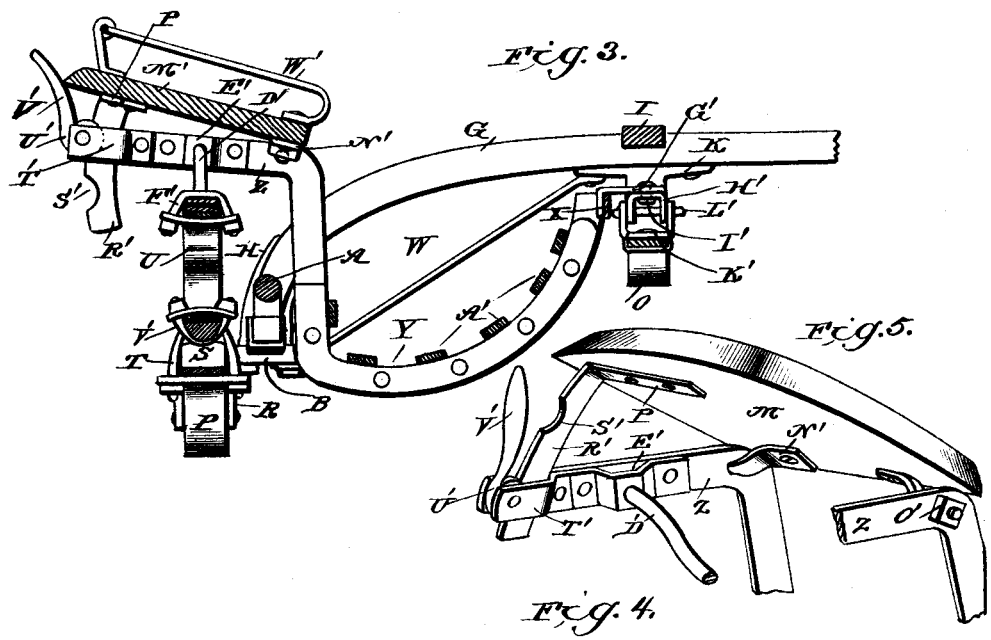
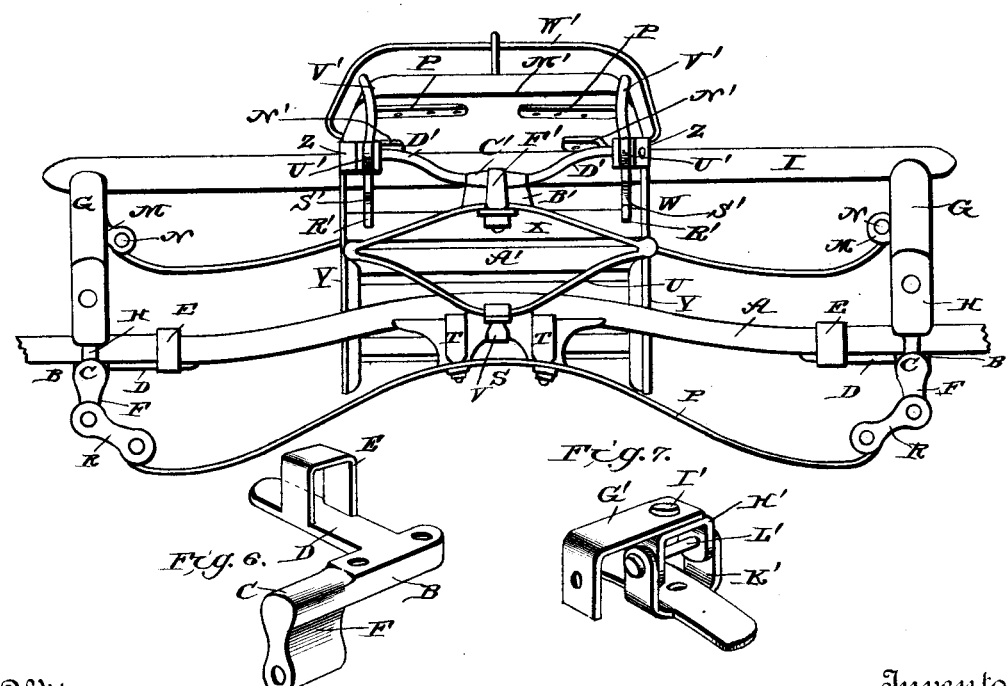
Witnesses.
Inventor,
Mathias M. Conner.
By his Attorneys

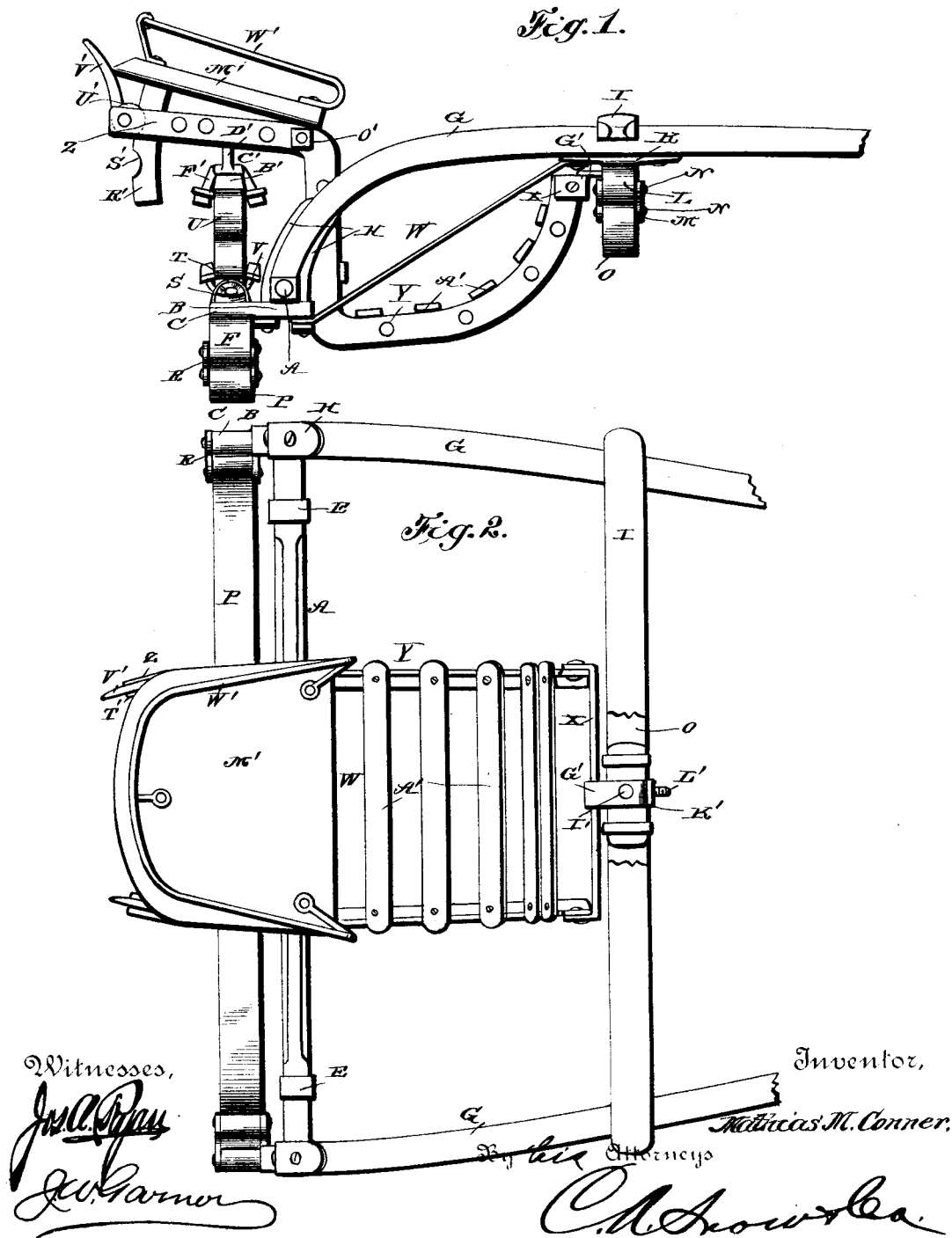

UNITED STATES PATENT OFFICE.

MATHIAS M. CONNER, OF ADA, OHIO, ASSIGNOR OF ONE-HALF TO WILLIAM H. CONNER, OF SAME PLACE.

TWO-WHEELED VEHICLE.

SPECIFICATION forming part of Letters Patent No. 388,834, dated September 4, 1888.

Application filed May 4, 1888. Serial No. 272,813. (No model.)

*To all whom it may concern:*

Be it known that I, MATHIAS M. CONNER, a citizen of the United States, residing at Ada, in the county of Hardin and State of Ohio, have invented a new and useful Improvement in Two-Wheeled Vehicles, of which the following is a specification.

My invention relates to an improvement in two-wheeled vehicles; and it consists in the peculiar construction and combination of devices, that will be more fully set forth hereinafter, and particularly pointed out in the claims.

In the accompanying drawings, Figure 1 is a side elevation of a two-wheeled vehicle embodying my improvements. Fig. 2 is a top plan view of the same. Fig. 3 is a vertical longitudinal central sectional view of the same. Fig. 4 is a rear elevation of the same. Fig. 5 is a detail perspective view of the seat and the approximate parts. Fig. 6 is a detail view of the coupling for the rear semi-elliptic spring with the axle, and Fig. 7 is a detail perspective view of the coupling between the seat and the front spring.

A represents the axle, which is preferably formed with its central portion bowed or arched upward to a slight extent; but the said axle may be formed straight, if desired.

B represents a pair of T-shaped yokes, which are arranged under the axle near the spindles thereof, have rearward-extending arms C, which project from the rear sides of the axle, and have inward-extending arms D, which are arranged under the axle and are provided with loops or keepers E, through which the axle extends. Formed at the rear end of the arms C are depending brackets F.

G represents the shafts or thills, which have their rear ends curved downward and bearing on the axle, and are secured to the yokes B by means of clip-bolts H, which are arranged on the front and rear sides of the downwardly-curved portions of the thills.

I represents the cross-bar, which connects the thills or shafts at a suitable distance in advance of the axle.

Arranged under the shafts or thills, at points below the ends of the cross-bars, are plates K, which are bolted to the thills and are provided with depending brackets L. To the said brackets are secured the upper ends of two pairs of links, M, by means of pivotal bolts N, which extend through said links and through longitudinal openings in the lower end of the brackets.

O represents a semi-elliptic spring, which has its ends curved upward and formed with eyes which engage pivotal bolts that connect the lower ends of the links N, and thereby the said spring is secured under the thills and is adapted to sway back and forth in a sidewise movement, as will be readily understood.

P represents a similar but somewhat heavier semi-elliptic spring, which has its ends curved upward and provided with eyes that receive pivotal bolts which connect the lower ends of two pairs of links R. The upper ends of said pairs of links are connected by pivotal bolts, which extend through longitudinal openings in the lower portions of the depending brackets F. By this means the spring P is also adapted to sway transversely when the vehicle is in motion. On the upper side of the spring P is secured a head-block, S, by means of clip-bolts T.

U represents an elliptic spring, which has its lower central portion secured on the head-block by means of a clip-bolt, V.

W represents the body of the vehicle, which is composed of a front cross-bar, X, having its ends bent rearward at right angles, curved side bars, Y, which have their front ends attached to the ends of the cross-bar, and are provided at their rear end with rearward-extending arms Z and a series of slats, A', which are secured to the curved front portions of the side bars at suitable distances apart and form foot-rests for the occupants of the vehicle.

On the upper side of the elliptic spring at the center of the same is a block, B', and on the said block is arranged the central portion of a support, C', which has a pair of arms, D', that curve upwardly, extend in opposite directions, and have their ends journaled in bearings E', that are bolted to the inner sides of the arms A'. The said support C' and also the block B' are secured in position on the upper side of the elliptic spring by means of a clip-bolt, F', as shown.

G' represents an arm which extends forward from the central portion of the cross-bar X, and is provided on its under side at its front end with an inverted-U-shaped plate or yoke, H', that is secured thereto by means of a pivotal bolt, I'.

K' represents a plate or yoke which is secured on the center of the spring O, and has vertical ears, which bear against the depending arms of the plate or yoke H', and are secured thereto by means of a pivotal bolt, L'. This arrangement of devices serves to connect the front end of the body flexibly to the front spring, O.

M' represents the vehicle-seat, which is provided on its under side, near its front corners, with bracket-arms N', that have spindles formed at their outer ends, which spindles pass through openings in the side bars, Y, and serve to pivotally attach the front side of the seat thereto. Suitable nuts, O', are screwed to the projecting ends of the spindles.

P' represents a pair of brackets, which are secured under the seat near the rear corners thereof, and are provided with depending vertical arms R', the said arms having curved recesses S' in their rear edges. On the inner sides of the arms Z, at the rear ends thereof, are bolted keepers T', which, together with the said arms Z, form guides through which the arms R' extend.

U' represents a pair of eccentric-cams, which are pivoted between the rear ends of the arms Z and the keepers T', and are provided with lever arms or handles V', by means of which said eccentric-cams may be turned, so as to engage the recesses S' of the arms R' and thereby secure the rear portion of the seat at any desired elevation. The said seat is provided with the usual side and back railings, W'.

The operation of my invention is as follows: The seat is supported directly over the springs P and U, so that very nearly all of the weight of the vehicle-body and of the occupants thereof is supported by the said springs, and only a very small proportion of the weight is applied to the front spring, O. The said front spring prevents the unpleasant motion of the horse from being communicated to the vehicle-body, and by reason of the front and rear springs being connected to the frame by the links hereinbefore described the said spring, together with the body of the vehicle, is adapted to sway laterally and thus cause the vehicle to ride very easily.

Inasmuch as the rear side of the seat is adapted to be vertically adjusted, the seat may be kept in a horizontal plane, no matter whether loaded heavily or lightly, this vertical adjustability of the seat serving to compensate for the depression of the rear spring when the vehicle is heavily loaded.

Changes in the form, proportion, and minor details of construction may be made without departing from the spirit or scope of my invention.

Having thus described my invention, I claim—

1. The combination, in a two-wheeled vehicle, of the axle or frame, the rear semi-elliptical spring connected thereto at its ends by flexible shackles or links, whereby said springs will sway laterally, the elliptic spring supported on the rear spring, the support C' on the upper side of the elliptic spring, and the body connected pivotally to the said support at a point under the seat, whereby the latter is arranged directly over the rear supporting-springs, substantially as described.

2. The combination, in a two-wheeled vehicle, of the body having its front and rear ends supported on springs, and the seat having its front side flexibly connected to the body, and devices, substantially as set forth, to vertically adjust the rear side of the seat, substantially as described.

3. The combination, in a body for two-wheeled vehicles, of the side bars or plates having the rearward-extending arms Z, the seat having its front side pivotally connected to the side bars or plates, the arms R', depending from the rear portion of the seat and bearing against the arms Z, and the cams or detents attached to said arms Z, and adapted to engage the arms R' and secure the seat at any desired adjustment, substantially as described.

4. The combination, in a two-wheeled vehicle, of the axle, the plates B, secured under the same, and having the rearward-extending arms C and the inward-extending arms D, the rear supporting-spring, P, and the links or shackles connecting the ends of the same flexibly to brackets F, which depend from the arms C, substantially as described.

5. The plates B, having the inward-extending arms D, adapted to be arranged under the axle, and provided with the keepers E, the arms C, extending rearward from the plates, and the brackets F, depending from the arms C, substantially as described.

6. The combination, in a two wheeled vehicle, of the thills, the axle, the front semi-elliptic spring having its ends suspended from the thills by flexible shackles, the rear semi-elliptic spring having its ends suspended from the axle by flexible shackles, the body, the flexible joint connecting the front end of the same to the front spring, and connection between the rear side of the body and the rear semi-elliptic spring, substantially as described.

7. The combination, in a two-wheeled vehicle, of the side bars or plates having the rearward-extending arms Z, the seat having its front corners pivoted or hinged to the side bars or plates, the arms R', depending from the rear corners of the seat and bearing against the arms Z and provided with the curved recesses, and the eccentric-cam journaled to the rear ends of arms Z and adapted to engage the notches in the arms R', for the purpose set forth, substantially as described.

8. In a two-wheeled vehicle, the combination, with the body, of the seat having its front end pivoted thereto, and the adjustable connection between the rear portion of the seat and the body, whereby the seat may be raised or lowered on its pivot and sustained at any point of its elevation, as set forth.

9. In a two-wheeled vehicle, the thills, the spring O, connected by links at its ends thereto, the body flexibly connected to the spring, the axle, the spring P, connected to the axle by links or shackles, the spring U, supported on the spring P, and the seat mounted on the spring U, as set forth.

10. In a two-wheeled vehicle, the thills, the front spring having its ends suspended from the thills by flexible shackles, the axle, the rear spring having its ends suspended from the axle by flexible shackles, the flexible joint connecting the front end of the body to the front spring, the seat, and the flexible joint connecting the body to the rear spring, as set forth.

In testimony that I claim the foregoing as my own I have hereto affixed my signature in presence of two witnesses.

MATHIAS M. CONNER.

Witnesses:
W. H. MORROW,
C. E. STUMM.